United States Patent Office 2,989,546
Patented June 20, 1961

2,989,546
SYNTHESIS OF FURANS
John D. Garber, Westfield, Robert A. Gasser, North Plainfield, and Robert E. Jones, Rahway, N.J., assignors to Merck & Co., Inc., Rahway, N.J., a corporation of New Jersey
No Drawing. Filed Dec. 30, 1958, Ser. No. 783,698
6 Claims. (Cl. 260—347.7)

This invention relates to the production of 5-aminomethyl-2-furfurylamine, and has for its object the provision of an improved process for producing this compound. The process of the invention comprises the amination of 5-aminomethyl-2-furfuryl alcohol to form the furan diamine

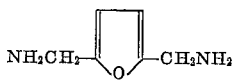

As a result of an extensive investigation we have discovered an effective process for the amination of 5-aminomethyl-2-furfuryl alcohol with ammonia, preferably in the presence of a suitable catalyst to produce the furan diamine. The compound 5-aminomethyl-2-furfuryl alcohol is a known compound disclosed, for example, in United States Patent No. 2,191,029 issued to James G. McNally and Joseph B. Dickey.

We have found that the 5-aminomethyl-2-furfuryl alcohol, an unsaturated compound, may be subjected to amination with ammonia at an elevated temperature and under appreciable pressure while maintaining the conjugated double bonds, and form the furan diamine.

In carrying out a process according to our invention we prefer to dissolve the 5-aminomethyl-2-furfuryl alcohol in a suitable organic solvent, such as an alcohol, methanol or ethanol, or dimethoxy ethane, and add an excess of ammonia, advantageously in the presence of a dehydrogenative type catalyst such as Raney nickel. The inert solvents such as dimethoxy ethane seem to give superior results than when using an alcohol, such as methanol, as a solvent. When a solvent is used the temperature should not exceed the critical temperature of the solvent. This mixture of materials is heated in an autoclave to a temperature above the critical temperature of ammonia, in the range of from 100° to 350° C., preferably at about 200° C., under a pressure of from 1000 to 10,000 p.s.i., the preferred pressure range being from 1500 to 6000 p.s.i. After several hours of agitation in the batch reactor the reaction product is recovered. This may be done by filtering to remove the catalyst, and concentrating the filtrate in a vacuum. The filtrate may be subjected to vacuum fractional distillation to separate the furan diamine from the crude product. Alternately, the process may be carried out in a continuous fashion, e.g. in a fixed bed reactor packed with catalyst or in the presence of a catalyst slurry.

Without intending to predicate the invention on any theory as to the reactions involved it appears that the reaction may take place as follows:

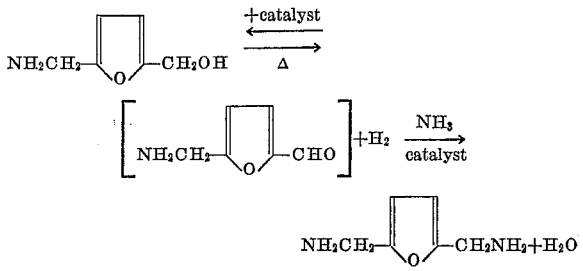

The preferred amount of ammonia should be in excess over the amount required in the above reaction for effective results as too little ammonia will result in the formation of secondary amines.

The following examples illustrate processes carried out according to the invention:

Example I 100.0 gm. of 5-aminomethyl-2-furfuryl alcohol was charged to a glass liner bomb together with 550 cc. of dimethoxy ethane, 200 gm. of $NH_3$ and 20 gm. of Raney nickel. The mixture was placed in a rocking autoclave, flushed with nitrogen and heated for 10 hrs. at 200° C. During this heating period, the pressure reached 1600 p.s.i.g. Then the catalyst was removed by filtration, the black filtrate was concentrated in vacuo, and a crude vacuum fractional distillation was carried out using an ordinary Claisen head.

In this operation the flushing with nitrogen was merely precautionary, as there is no definite evidence that it is necessary.

In the fractional distillation those cuts rich in diamine on the basis of refractive index, N analysis and picrate formation, were combined and redistilled. Two of these cuts were combined giving 32.4 gm. of 5-aminomethyl-2-furfurylamine. An IR curve was identical with a reference sample prepared by the Gabriel method. The yield by direct amination was 32.4% and if reusable starting material is taken into account, the yield was 56.3%.

The following example illustrates a larger scale amination of 5-aminomethyl-2-furfuryl alcohol to 2,5-diaminomethyl furan:

Example II

| | |
|---|---|
| 5-aminomethyl furfuryl alcohol (87.2% pure)_g__ | 198 |
| Dimethoxy ethane _____ml__ | 1590 |
| Raney nickel _____g__ | 44.4 |
| Liquid ammonia _____g__ | 528 |

The above ingredients were added to the bomb, heated to 200° C. and held for 10 hrs. The maximum pressure was 1550 p.s.i.

The product was filtered through a ¼" bed of Supercel using a methanol rinse. The solution was evaporated under water-pump vacuum and finished off at 3 mm. The yield was 170.8 g. of black oil. The oil was distilled at 2 mm. and cuts were taken below 112° C. A cut at 112–125° C. was taken as unreacted amino alcohol. The low boiling cuts, which all contained amino alcohol were redistilled. The yields and calculations are as follows:

From 2nd distillation:

| Cut | B.P./2 mm. | wt. | Yield (per pass) | E, percent | Purity, percent | Percent N |
|---|---|---|---|---|---|---|
| 1 | 68–80 | 2.60 | } 59.03=34.2% | 642 | 83.0 | |
| 2 | 80–85 | 7.36 | | 687 | 88.9 | 17.94 |
| 3 | 85–93 | 38.73 | | 751 | 97.0 | 20.69 |
| 4 | 98–110 | 10.34 | | 469 | | |
| 5 | 110–125 | 80.31 | 46.6% | | | |
| tar | | 18.60 | | | | |

The over-all yield of furan diamine based on 53.4% conversion of the amino alcohol was 64.0%, based on pure amino alcohol consumed.

We claim:
1. The process for producing 5-aminomethyl-2-furfurylamine which comprises subjecting 5-aminomethyl-2-furfuryl alcohol to amination with an excess of ammonia at an elevated temperature above the critical temperature of ammonia and under a pressure of from 1000 to 10,000 p.s.i.

2. In the process of claim 1, carrying out the amination in solution in an organic solvent of the group consisting of a lower alkanol and an alkyl ether, and with a hydrogenation catalyst consisting of Raney nickel.

3. The process for producing 5-aminomethyl-2-furfurylamine which comprises subjecting 5-aminomethyl-2-furfuryl alcohol to amination with an excess of ammonia at a temperature of from 100° to 350° C. and under a pressure of from 1000 to 10,000 p.s.i.

4. In the process of claim 3 carrying out the amination at a pressure of from 1500 to 6000 p.s.i.

5. In the process of claim 3 carrying out the amination at a temperature of about 200° C. with Raney nickel.

6. In the process of claim 3 carrying out the amination in the presence of Raney nickel and in solution in an organic solvent of the group consisting of a lower alkanol and an alkyl ether.

References Cited in the file of this patent
UNITED STATES PATENTS

| | | |
|---|---|---|
| 2,474,781 | Dixon | June 28, 1949 |
| 2,580,221 | Dixon | Dec. 25, 1951 |

OTHER REFERENCES

Kline et al.: J. Amer. Chem. Soc., vol. 66 (1944), pages 1710–1714.